May 10, 1949.　　　　G. EATON　　　2,469,871
GRINDING WHEEL DRESSER
Filed June 13, 1946
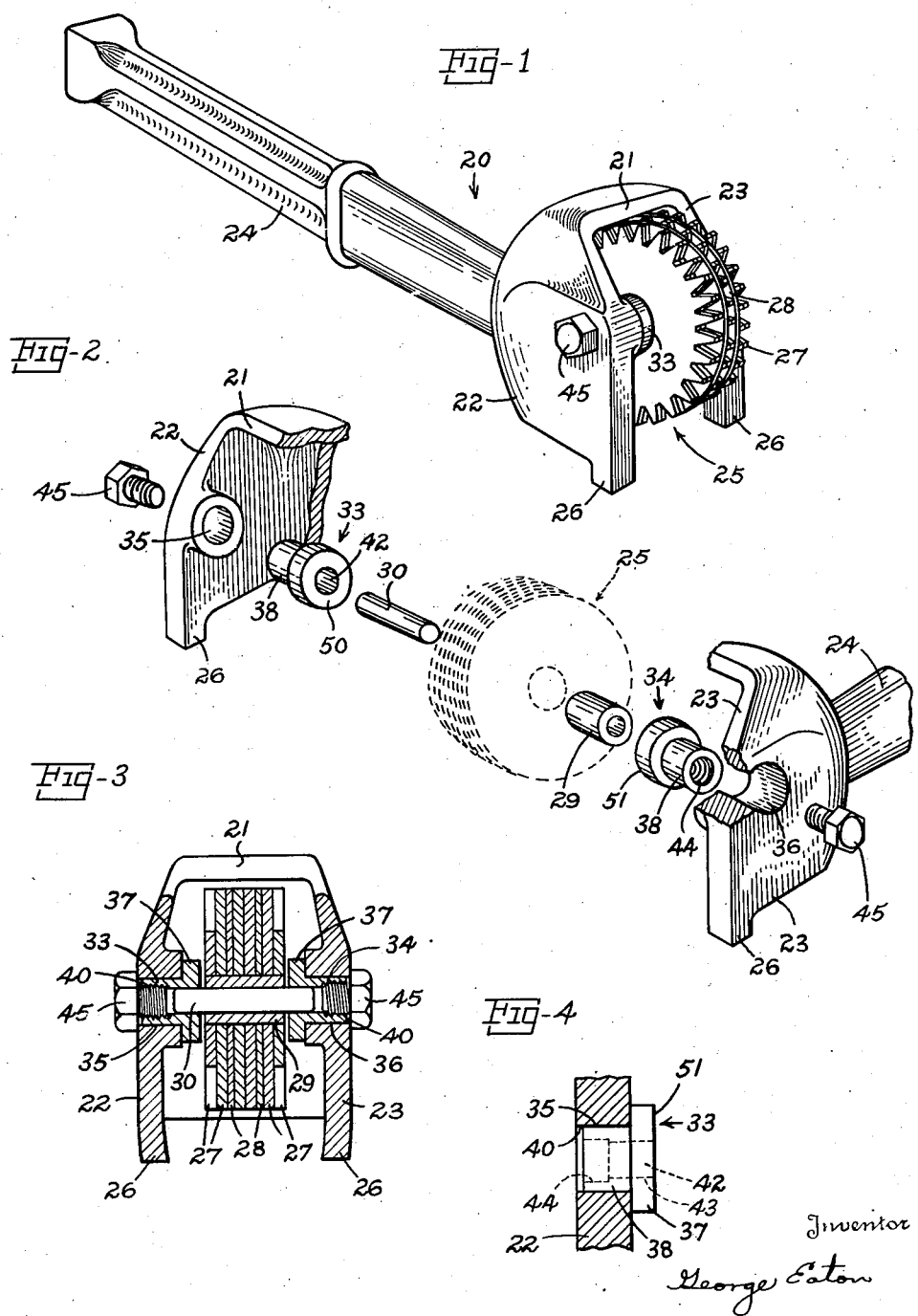
Inventor
George Eaton
By
Marechal & Biebel
Attorneys Patented May 10, 1949

2,469,871

UNITED STATES PATENT OFFICE 2,469,871

GRINDING WHEEL DRESSER

George Eaton, Urbana, Ohio, assignor to The Desmond-Stephan Mfg. Co., Urbana, Ohio, a partnership Application June 13, 1946, Serial No. 676,367

12 Claims. (Cl. 125—37)

This invention relates to devices or tools of the type used for dressing and truing operations in connection with grinding wheels and the like, and more particularly to a means for mounting the rotating cutters therein.

It has been found in connection with dressing or truing up the face of a grinding wheel composed of an abrasive material, that the dressing tool is subjected to severe vibration forces, and in addition the cutters are rotated at high speeds in the presence of abrasive dust and necessarily under conditions which make proper lubrication difficult. It is thus readily apparent that the dresser or tool head and cutters because of the severe operating conditions encountered are subjected to excessive wear. As a result a relatively short useful life is obtained which requires frequent replacement of parts such as the cutters, the pin supporting the rotatable cutters, the sleeve enclosing this pin, the bushings in which the pin is journaled, and even the head itself.

Accordingly, it is one of the principal objects of this invention to provide a hand tool or dresser for a grinding wheel which is so constructed that it will be better able to withstand vibration and to resist wear at the critical points and thus have a materially longer, useful life than is possible with the presently known types of dressers.

Another object is to provide a dresser of the type described which, in addition to being of rugged construction, contains relatively few parts easy to remove and replace, which can be manufactured economically, and which is advantageous in use in that the useful life of the dresser is materially prolonged and replacement of parts delayed thus insuring maximum service and economical operation.

It is also one of the objects of the invention to provide such a dresser in which there is a bushing so constructed that it will prevent wear on the dresser head side walls by preventing the rotatable cutters from coming in contact therewith, the construction also being such that there is less tendency for the bushings to be loosened because of vibration, thus preventing play, and thereby materially prolonging the life of the head portion, and which, in addition, protects the head from wear resulting from normal rotation in that the rotational wear from the pin supporting the cutters occurs within the bore of the bushings and not within the head.

It is also an object to provide such a dresser having a bushing the construction of which is such that it will tend to prevent excessive wear of the pin supporting the rotatable cutters so that vibration will not tend to loosen the bushing and thereby permit a threshing motion of the pins or bushings to develop in the head of the dresser.

It is also an object to provide a dresser of this character having a bushing constructed of hardened steel and formed so as to present hardened surfaces in contact with both the pin and the rotatable cutters.

Another object resides in the provision in such a dresser of a bushing construction which tends to overcome the effects heretofore caused by vibration loosening the bushing in that, in addition to the bushing being received in the dresser head by a pressed fit, it is also secured by a further force which augments or reinforces the pressed fit to reliably secure the bushings against rotation within the side walls.

Other objects and advantages of this invention will be apparent from the following description, the appended claims, and the accompanying drawings, in which:

Fig. 1 is a perspective view showing a grinding wheel dresser constructed in accordance with the present invention;

Fig. 2 is an exploded view of the head of the dresser, part of the side wall being broken away, showing the relative arrangement of the parts;

Fig. 3 is a vertical sectional view, partly in elevation, taken through the head of the dresser; and Fig. 4 is an enlarged, fragmentary, vertical sectional view through a portion of a side wall and bushing, with the cutter pin and cap screw removed, showing the central bore and the clearance between the end of the bushing and the outer edge of the side wall.

Referring to the drawings which illustrate a preferred embodiment of the invention, and to Fig. 1 in particular, there is shown a dresser for grinding wheels and the like, referred to generally by the reference numeral 20, which comprises a casting having a head 21 formed with a pair of spaced side walls 22 and 23, and a handle 24 attached thereto which enables the operator to position and hold the cutters or cutting wheel 25 against the face of the grinding wheel which is to be dressed or trued, the usual legs 26 being provided at the lower ends of walls 22 and 23 to facilitate such operation.

The cutters which comprise a plurality of notched or toothed wheels 27 separated by flat disks 28 are mounted for free and independent rotation on a pin 30. Preferably a freely rotating sleeve 29 is interposed between the cutters and the pin and in this way the frictional forces generated by the rotating cutters are divided between the rotatable sleeve and the rotating pin, the sleeve rotating at a lower speed than the cutters and the pin more slowly than the sleeve.

To provide bearing surfaces for supporting pin 30, identical bushings 33 and 34 of hardened steel have been provided which are secured in the bores 35 and 36, drilled and reamed through the side walls. The bushings are secured in the respective bores by means of a press fit. Referring to Figs. 3 and 4, it can be seen that each of the bushings has a flange 37 formed at one end and a shank 38 of reduced diameter integral therewith. It will be apparent from the drawings that each flange is adapted to seat flush against the inside of one of the side walls 22, 23, and that the shanks extend within the bores 35, 36, where they are secured by means of a press fit.

Referring again to Fig. 4, it should be noted also that the length of the shank is less than the thickness of the side wall. There is thus provided a clearance, indicated by the reference numeral 40, between the outside edge of the side wall and the shank end of the bushing which may be of the order of one sixteenth of an inch, where for example, the side wall is of the order of seven sixteenths of an inch in thickness and the shank has a length of three eighths of an inch.

Extending through the bushing is a central bore generally referred to by the reference numeral 42. It will be seen from Fig. 4 that this bore has a portion 43 extending inwardly from the flange end which is of reduced diameter with respect to that portion 44 of the bore which extends inwardly from the shank end of the bushing. These will be referred to hereafter for the sake of clarity as the bore 43 and the bore 44, which it is to be understood are connected and together to form the central bore 42 extending through the bushing. It is to be noted in this construction that the total length of the bore 42 is divided between the bearing portion 43 and the threaded portion 44 to provide as much bearing surface as possible while still providing sufficient threaded area, the division of the bore 42 between these two portions not being necessarily related to the respective lengths of the flange and the shank portions of the bushing.

Bore 43 is of sufficient diameter to receive the pin 30, and provides a hardened bearing surface in which it can freely rotate. Bore 44, which is of greater diameter, is threaded to receive the thread of a headed screw 45, such as a cap screw. It is preferred that this bore be threaded to a depth which will be equal to, or slightly greater, than the length of the threaded portion of the cap screw used. Thus, referring to the example previously given, if the length of the cap screw thread is of the order of five sixteenths of an inch, the length of the threaded portion in bore 44 will be at least five sixteenths of an inch. It is therefore impossible for the cap screw thread to bottom in bore 44 since, as above described, there has been provided a clearance 40 between the shank end of the bushing and the outer face of the side wall. Clearance 40 also prevents contact between the heads of screws 45 and the ends of bushings 33 and 34. From this it will be apparent that, when the cap screws have been drawn up so that the heads are flush against the outside of the side walls, a take-up or clearance exists which provides for holding the bushings under tension, and which is a supplementary force to that obtained from the press fit used to secure the shank end of the bushings within the side walls.

To assemble the cutters in the head, pin 30 carrying sleeve 29 with the cutters 25 mounted thereon is placed so that its ends are supported within bore 43 of the bushings 33 and 34. It is to be noted also, as shown in Fig. 3, that when pin 30 is mounted in position between the bushings 33—34 its axial length is such that a clearance exists between each end thereof and the threaded ends of the inserted cap screws. Thus the pin is always free to rotate within the confines of the bores 43 in the bushings 33 and 34. In this position the cutters are free to rotate against the inside surfaces 50 and 51 of the bushings and do not come in contact with the side walls of the head. The cap screws mounted in the bores 44 of each bushing, in addition to aiding in holding the bushings in position, prevent the pin 30 from being removed and complete the assembly. To remove the cutters for replacement or inspection it is only necessary to remove one of the cap screws and pin 30 is then free to slide through the bore 42 and thus be removed.

From the above description it will be apparent that there is provided a dresser for grinding wheels which is so constructed that it will tend to prevent wear at two critical points where wear has occurred in previous dressers, one of these being in the dresser head and caused by contact with the rotating cutters, and the other being at the pin bushings and caused by vibration loosening the bushings and permitting a threshing motion to develop. Thus protection has been provided against wear resulting from the normal rotation in that the rotating cutters, which are rotatably mounted on a sleeve which in turn is rotatably supported on a pin free to rotate, bear against the flanged portions of the bushings which are hardened, and the rotational wear from the pin occurs within the bore of the hardened steel bushings. There is also the advantage provided from the construction here in that the bushings, in addition to being secured by a press fit, are held under tension and therefore have less tendency to thresh about in the head, thus looseness and play which would otherwise occur are delayed and the life of the head materially prolonged.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A tool for dressing grinding wheels comprising a head formed to provide a pair of spaced side walls, a bushing secured in each side wall, a pin rotatably journaled in said bushings, cutters rotatably mounted on said pin between the side walls, each said bushing having a flange portion and a shank portion with a central bore extending through said portions, the length of said shank portion being less than the thickness of the side wall, the outer portion of said bore being threaded and a headed screw threadedly received in said outer threaded portion.

2. A tool for dressing grinding wheels comprising a head formed to provide a pair of spaced side walls, a bushing secured in each side wall, a pin rotatably journaled in said bushings, a sleeve rotatably mounted on said pin and cutters rotatably mounted on said sleeve between the side walls, each said bushing having a central bore extending therethrough, said bore in one end thereof being threaded, and a headed screw threadedly received in said threaded end.

3. A grinding wheel dresser comprising a head formed to provide a pair of spaced side walls, a bushing secured in each side wall, that portion of each bushing which extends within the side wall being of a length less than the thickness of the side wall, each bushing having a central bore extending therethrough, the bore being threaded at one end, a headed screw threadedly received within said threaded bore portion having a thread the engaged length of which is less than the length of said threaded bore portion, a pin rotatably journaled in said bushings, and cutters rotatably mounted on said pin between said side walls.

4. A grinding wheel dresser comprising a head formed to provide a pair of spaced side walls, a bushing secured in each side wall, that portion of each bushing which extends within the side wall being of a length less than the thickness of the side wall, each bushing having a central bore extending therethrough, the bore being threaded at the outer end thereof, a headed screw threadedly received within said threaded bore portion having a thread the engaged length of which is less than the length of said threaded bore portion, a pin rotatably mounted in the inner end of said bore which is adapted to provide a bearing surface therefor, and cutters rotatably mounted on said pin between the side walls.

5. A tool for dressing grinding wheels comprising a head formed to provide a pair of spaced side walls, a bushing secured in each side wall, a pin rotatably journaled in said bushings, cutters rotatably mounted on said pin between the side walls, each said bushing having a flanged portion and a shank portion, the length of the shank portion being less than the thickness of the side wall, said bushing also having a central bore extending therethrough, a portion of the bore in said shank portion being threaded, a headed screw threadedly received in said threaded shank portion, the diameter of said central bore other than that of the said threaded portion being reduced to provide a bearing surface for said pin.

6. A tool for dressing grinding wheels comprising a head formed to provide a pair of spaced side walls, a bushing secured in each side wall, a pin rotatably journaled in said bushings, a sleeve rotatably mounted on said pin, cutters rotatably mounted on said sleeve between the side walls, each said bushing having a flanged portion and a shank portion, the length of the shank portion being less than the thickness of the side wall, said bushing also having a central bore extending therethrough, a portion of the bore in said shank portion being threaded, a headed screw threadedly received in said threaded shank portion, the diameter of said central bore other than that of the said threaded portion being reduced to provide a bearing surface for said pin.

7. A tool for dressing grinding wheels comprising a head formed to provide a pair of spaced side walls, a bushing secured in each side wall, a pin rotatably journaled in said bushings, a sleeve rotatably mounted on said pin, cutters rotatably mounted on said sleeve between the side walls, each said bushing having a flanged portion and a shank portion, the length of the shank portion being less than the thickness of the side wall, said bushing also having a central bore extending therethrough, the bore in said shank portion being threaded, a headed screw threadedly received within the bore of said shank portion having a thread slightly less in engaged length than the length of said threaded portion of the bore, the diameter of the bore in said flange portion being such that it provides a bearing surface for said pin.

8. In a grinding wheel dresser, a head having a pair of spaced side walls, a pin rotatably mounted between the side walls, a sleeve mounted so as to rotate freely on said pin, a plurality of toothed cutting wheels rotatably mounted on said sleeve, and a bushing to support said pin secured by a press fit in each side wall, the bushing having a flange and a shank of reduced diameter, the length of the shank being less than the thickness of the side wall, said bushing having a central bore extending therethrough of sufficient diameter to permit said pin to pass freely therethrough, a portion of the bore within said shank being threaded, a headed screw threadedly received within said shank, the threaded portion of said bore being of slightly greater length than the engaged length of said headed screw thread providing for placing the bushing under tension upon tightening of said headed screw.

9. In a grinding wheel dresser, a head having a pair of spaced side walls, a pin rotatably mounted between the side walls, a sleeve mounted so as to rotate freely on said pin, a plurality of toothed cutting wheels rotatably mounted on said sleeve, and a bushing of hardened steel in each side wall to support said pin and formed with an integral flange and a shank portion of reduced diameter which is received in each side wall by a press fit, means for holding each bushing under tension comprising a headed screw adapted to extend through the side wall into the bushing, said bushing having a central bore of sufficient diameter to permit said pin to pass freely therethrough, a portion of said bore within the shank portion of the bushing being threaded and of sufficient diameter to receive said headed screw thread, said pin being mounted in that portion of said bore extending through the flange which provides a bearing surface therefor and in spaced relation with respect to the inner opposed ends of said headed screws.

10. A tool for dressing grinding wheels comprising a head formed to provide a pair of spaced side walls, a bushing having a central bore extending therethrough secured in each side wall by a press fit, a pin rotatably journaled in said bore of said bushings, cutters rotatably mounted on said pin between the side walls, each said bushing having a flange received against the inside of each said side wall preventing said cutters from engaging with said side wall and a threaded shank portion, and means coacting with said threaded shank portion and the outside of said side walls for holding each said bushing under tension in said side wall.

11. A tool for dressing grinder wheels comprising a head formed to provide a pair of spaced side walls, a bushing fitted into each side wall, a pin rotatably journaled in said bushings, cutters rotatably mounted on said pin between said side walls, each said bushing having a flange portion adapted to bear against the inner surface of the adjacent side wall and a shank portion with a central bore extending through said portions, and means engaging said shank portion of said bushing and adapted to bear against the outer surface of the adjacent side wall to retain said bushing in fixed relation in said side wall with said flange against the inside surface of said side wall.

12. A tool for dressing grinder wheels comprising a head formed to provide a pair of spaced side walls, a bushing fitted into each side wall, a pin rotatably journaled in said bushings, cutters rotatably mounted on said pin between said side walls, each said bushing having a flange portion adapted to bear against the inner surface of the adjacent side wall and a shank portion with a central bore extending through said portions, and means engaging said shank portion of said bushing and adapted to bear against the outer surface of the adjacent side wall to retain said bushing in fixed relation in said side wall with said flange against the inside surface of said side wall, said shank engaging means including means to retain said pin in operative position within said bore.

GEORGE EATON.

REFERENCES CITED

The following references are of record in the file of this patent:

UNITED STATES PATENTS

| Number  | Name    | Date          |
|---------|---------|---------------|
| 389,064 | Douglas | Sept. 4, 1888 |
| 442,782 | Reed    | Dec. 16, 1890 |
| 498,220 | Alger   | May 30, 1893  |
| 902,660 | Howarth | Nov. 3, 1908  |
| 990,027 | Abraham | Apr. 18, 1911 |